United States Patent [19]

Hayama et al.

[11] Patent Number: 5,180,766
[45] Date of Patent: Jan. 19, 1993

[54] RESIN COMPOSITION FOR PRIMER USE AND PRIMER COMPOSITION EMPLOYING THE SAME

[75] Inventors: Kazuhide Hayama; Kazuyuki Hata; Katsuhiko Yamada; Keizo Abe; Takahiro Ozu, all of Mie, Japan

[73] Assignee: Mitsubishi Petrochemical Co., Ltd., Tokyo, Japan

[21] Appl. No.: 687,517

[22] Filed: Apr. 19, 1991

[30] Foreign Application Priority Data

May 14, 1990 [JP] Japan .................................. 2-123854

[51] Int. Cl.⁵ ...................... C08F 255/02; C08K 5/06; C08K 5/07; C08K 5/10
[52] U.S. Cl. .................................. 524/315; 524/356; 524/366; 524/474; 524/482; 524/484; 525/276; 525/285; 525/286; 525/293; 525/301; 525/309
[58] Field of Search ............... 524/315, 356, 366, 474, 524/482, 484; 525/276, 285, 286, 293, 301, 309

[56] References Cited

U.S. PATENT DOCUMENTS

| | | | |
|---|---|---|---|
| 3,832,423 | 8/1974 | Milkovich et al. | 525/292 |
| 3,842,146 | 10/1974 | Milkovich et al. | |
| 3,929,935 | 12/1975 | Kinstle | |
| 4,190,569 | 2/1980 | Kroker | 524/484 |
| 4,789,568 | 12/1988 | Matoba et al. | 525/285 |
| 4,839,414 | 6/1989 | Bederke et al. | 524/315 |

FOREIGN PATENT DOCUMENTS 0308146  3/1989  European Pat. Off. .
2424308 11/1979  France .

OTHER PUBLICATIONS

Patent Abstracts of Japan, vol. 12, No. 242 (C-510) [3089], Jul. 8th, 1988; & JP-A-63 033 406 (Dainippon Ink & Chem. Inc.) Feb. 13, 1988.
WPIL, File Supplier, AN=88-101759, Derwent Publications Ltd, London, GB; & JP-A-63 051 477 (Mitsubishi Petrochem.) Mar. 4, 1988.

*Primary Examiner*—Jacob Ziegler
*Attorney, Agent, or Firm*—Oblon, Spivak, McClelland, Maier & Neustadt

[57] ABSTRACT

A resin composition for primer use is described, which contains a copolymer of (I) a radical-polymerizable olefin resin and (c) a monomer copolymerizable with said olefin resin (I) and containing an alkyl (meth)acrylate and/or a fluorine-containing unsaturated monomer as essential ingredients, said radical-polymerizable olefin resin (I) being a product of the reaction of (a) an olefin resin having at least one functional group per molecule with (b) a radical-polymerizable monomer having a functional group reactive to the functional group contained in said olefin resin (a).

A primer composition is also described.

8 Claims, No Drawings

RESIN COMPOSITION FOR PRIMER USE AND PRIMER COMPOSITION EMPLOYING THE SAME

FIELD OF THE INVENTION

The present invention relates to a resin composition which gives a primer useful for enhancing the adhesion between polyolefin resin substrates and fluorine-contained resins, and also relates to a primer composition employing the above resin composition.

BACKGROUND OF THE INVENTION

Fluorine-contained resins have excellent hardness, abrasion resistance, chemical resistance, solvent resistance, and weatherability. Because of these properties, which are very desirable to covering materials, fluorine-contained resins are extensively used as coating materials on various substrates.

However, fluorine-contained resins are defective in that since their adhesion to various substrates is poor, coating films formed by applying fluorine-contained resins on surfaces of various substrates are apt to peel off.

As expedients for improving the poor adhesion of fluorine-contained resins to, for example, metallic substrates, use of a composition, as a primer, comprising an epoxy-acrylate resin, a vinylidene fluoride resin, a methacrylate resin, etc. is disclosed in JP-A-1-149880 (the term "JP-A" as used herein means an "unexamined published Japanese patent application") and, further, use of a composition, as a primer, comprising a polyol resin, a polyisocyanate compound, and a thermoplastic acrylic resin as essential ingredients is disclosed in JP-A-1-146965.

Techniques of coating a fluorine-contained resin on substrates made of polyolefin resins represented by polyethylene and polypropylene, however, are still insufficient, and the defect that coating films formed are prone to peel off still remains unsolved.

SUMMARY OF THE INVENTION

An object of the present invention is to provide a resin composition suited for use in a primer for enhancing the adhesion between polyolefin resins and fluorine-contained resins.

Another object of the present invention is to provide a primer composition employing the above resin composition.

Other objects and effects of the present invention will be apparent from the following description.

The present inventors have made intensive studies and, as a result, it has now been found that the above objects are accomplished with the composition specified below.

That is, the present invention provides a resin composition for primer use which contains a copolymer of (I) a radical-polymerizable olefin resin and (c) a monomer copolymerizable with the olefin resin (I) and containing an alkyl (meth)acrylate and/or a fluorine-containing unsaturated monomer as essential ingredients, the radical-polymerizable olefin resin (I) being a product of the reaction of (a) an olefin resin having at least one functional group per molecule with (b) a radical-polymerizable monomer having a functional group reactive to the functional group contained in the olefin resin (a).

The present invention further provides a primer composition for fluorine-contained resins which comprises the above resin composition dissolved in an organic solvent.

DETAILED DESCRIPTION OF THE INVENTION

The olefin resin (a) which has at least one functional group per molecule and is used as a raw material for producing the radical-polymerizable olefin resin (I) to be used for producing the composition of the present invention has a weight-average molecular weight of preferably about from 1,000 to 200,000, more preferably about from 10,000 to 100,000. If the molecular weight of the olefin resin (a) is too low, the final primer composition shows poor adhesion to substrates. If the molecular weight thereof is too high, the radical-polymerizable olefin resin (I) to be obtained from such an olefin resin (a) tends more to suffer gelation when copolymerized with a monomer (c).

The olefin resin (a) having at least one functional group per molecule can be obtained by reacting an ordinary polyolefin with an unsaturated compound having a desired functional group. Examples of the precursor polyolefin include homopolymers or copolymers of α-olefins, such as polyethylene, polypropylene, poly(butene-1), ethylene-propylene copolymers, and ethylene-butene copolymers; copolymers of α-olefins and conjugated dienes, such as ethylene-propylene-diene copolymers and isobutene-isoprene copolymers; poly(conjugated diene)s such as polybutadiene and polyisoprene; copolymers of aromatic vinyl compounds and conjugated dienes, such as styrene-butadiene copolymers, styrene-butadiene-styrene block copolymers, hydrogenated styrene-butadiene-styrene block copolymers, styrene-isoprene copolymers, styrene-isoprene-styrene block copolymers, and hydrogenated styrene-isoprene-styrene block copolymers; chlorinated polyolefins obtained by chlorinating the above polyolefins; and the like. Examples of the unsaturated compound that has a functional group and is to be reacted with the precursor polyolefin include: unsaturated carboxylic acids and anhydrides thereof such as (meth)acrylic acid, fumaric acid, maleic acid and its anhydride, itaconic acid and its anhydride, crotonic acid and its anhydride, citraconic acid and its anhydride, and the like, in the case of incorporating a carboxylic acid group or a carboxylic acid anhydride group into the precursor polyolefin; glycidyl esters of unsaturated carboxylic acids such as glycidyl (meth)acrylate, mono- or diglycidyl ester of maleic acid, mono- or diglycidyl ester of itaconic acid, and mono- or diglycidyl ester of allylsuccinic acid, glycidyl ester of p-styrene-carboxylic acid, glycidyl ethers such as allyl glycidyl ether, 2-methylallyl glycidyl ether, and styrene p-glycidyl ether, p-glycidylstyrene, epoxyolefins such as 3,4-epoxy-1-butene and 3,4-epoxy-3-methyl-1-butene, vinylcyclohexene monooxide, and the like, in the case of incorporating an epoxy group; hydroxyalkyl (meth)acrylates such as 2-hydroxyethyl (meth)acrylate, 2-hydroxypropyl (meth)acrylate, and 2-hydroxybutyl (meth)acrylate, N-methylol(meth)acrylamide, addition polymers of 2-hydroxyethyl acrylate and 6-hexanolide, alkenyl alcohols such as 2-propen-1-ol, alkynyl alcohols such as 2-propyn-1-ol, hydroxyvinyl ethers, and the like, in the case of incorporating a hydroxyl group; and 2-isocyanatoethyl (meth)acrylate, methacryloyl isocyanate, and the like, in the case of incorporating an isocyanate group. The reaction of a polyolefin with an unsaturated compound having a functional group may be conducted in an ordinary manner using a free-radical initiator. Most preferred of the above-enumerated polyolefins are styrene-based elastomers such as styrene-butadiene-styrene block copolymers or their hydrogenation products and modified polyolefins obtained by chlorination of polyolefins.

In the reaction of a polyolefin with an unsaturated compound having a functional group, the proportion of the unsaturated compound to the polyolefin is determined so as to yield an olefin resin (a) in which the content of units derived from the unsaturated compound having the desired functional group is from 0.1 to 10% by weight, preferably from 0.5 to 5% by weight.

If the content of units derived from the functional group-containing unsaturated compound in the olefin resin (a) is less than 0.1% by weight, a radical-polymerizable olefin resin (I) to be obtained by reacting the olefin resin (a) with a radical-polymerizable monomer (b) having a functional group reactive to the functional group contained in the olefin resin (a) has too low a radical-polymerizable group content and, as a result, the final resin composition to be obtained through the copolymerization reaction of such a radical-polymerizable olefin resin (I) with a monomer (c) is disadvantageous in that the content of homopolymer of the monomer (c) in the resin composition is too high. On the other hand, if the content of units derived from the functional group-containing unsaturated compound in the olefin resin (a) exceeds 10% by weight, gelation tends more to occur in the copolymerization thereof with a monomer (c).

The reaction of a polyolefin with a functional group-containing unsaturated compound may be conducted by a method in which these raw materials are melt-kneaded with an extruder at 50° to 300° C. for 1 to 30 minutes in the presence of a free-radical initiator, a method in which these raw materials are dissolved with heating in an organic solvent such as toluene, xylene, or chlorobenzene and allowed to react at 50° to 200° C. for 1 to 10 hours, or by other methods.

As the free-radical initiator, an ordinarily used one may be employed. Examples thereof include alkyl peroxides such as di-t-butyl peroxide and t-butyl hydroperoxide, aryl peroxides such as dicumyl peroxide and cumyl hydroperoxide, acyl peroxides such as dilauroyl peroxide, aroyl peroxides such as dibenzoyl peroxide, ketone peroxides such as methyl ethyl ketone peroxide, azonitriles such as azobisisobutyronitrile, and the like.

The thus-obtained olefin resin (a) having at least one functional group per molecule can, in some cases, contain a small proportion of an unmodified polyolefin. Such an olefin resin, however, may be used as it is as a reactant material for producing a radical-polymerizable olefin resin (I).

The radical-polymerizable olefin resin (I) to be used for producing the resin composition of the present invention is obtained by reacting the functional group contained in the olefin resin (a) with a radical-polymerizable monomer (b) having a functional group reactive to the functional group of the olefin resin (a). In the case where the olefin resin (a) contains a carboxylic acid group or a carboxylic acid anhydride group, the functional group contained in the radical-polymerizable monomer (b) and reactive to the functional group in the olefin resin (a) may be hydroxyl group, epoxy group, or isocyanate group. Examples of the hydroxyl group-containing radical-polymerizable monomer (b) include hydroxyalkyl (meth)acrylates such as 2-hydroxyethyl (meth)acrylate, 2-hydroxypropyl (meth)acrylate, and 2-hydroxybutyl (meth)-acrylate, N-methylol(meth)acrylamide, addition polymers of 2-hydroxyethyl acrylate and 6-hexanolide, alkenyl alcohols such as 2-propen-1-ol, alkynyl alcohols such as 2-propyn-1-ol, hydroxyvinyl ethers, and the like. Examples of the epoxy group-containing radical-polymerizable monomer (b) include glycidyl esters of unsaturated carboxylic acids such as glycidyl (meth)acrylate, mono- or diglycidyl ester of maleic acid, mono- or diglycidyl ester of itaconic acid, and mono- or diglycidyl ester of allylsuccinic acid, glycidyl ester of p-styrenecarboxylic acid, glycidyl ethers such as ally glycidyl ether, 2-methylallyl glycidyl ether, and styrene p-glycidyl ether, p-glycidylstyrene, epoxyolefins such as 3,4-epoxy-1-butene and 3,4-epoxy-3-methyl-1-butene, vinylcyclohexe monooxide, and the like. Examples of the isocyanate group-containing radical-polymerizable monomer (b) include 2-isocyanatoethyl (meth)acrylate, methacryloyl isocyanate, and the like. Of these radical-polymerizable monomers, those having a hydroxyl group are most preferred.

In the case where the olefin resin (a) contains an epoxy group, the functional group contained in the radical-polymerizable monomer (b) and reactive to the epoxy group may be carboxyl group or hydroxyl group. Examples of the carboxyl group-containing radical-polymerizable monomer (b) include unsaturated acids such as (meth)acrylic acid, carboxyalkyl vinyl ethers such as carboxyethyl vinyl ether and carboxypropyl vinyl ether, and the like. Examples of the hydroxyl group-containing radical-polymerizable monomer (b) include the monomers enumerated above as examples of the radical-polymerizable monomer (b) having a hydroxyl group reactive to a carboxylic acid group or carboxylic acid anhydride group contained in the olefin resin (a). Of these radical-polymerizable monomers, those having a carboxyl group are most preferred.

In the case where the olefin resin (a) contains a hydroxyl group, the functional group contained in the radical-polymerizable monomer (b) and reactive to the hydroxyl group may be isocyanate group, carboxyl group, or epoxy group. Examples of the isocyanate group-containing radical-polymerizable monomer (b) and examples of the epoxy group-containing radical-polymerizable monomer (b) include the monomers enumerated above as examples of those reactive to a carboxylic acid group or carboxylic acid anhydride group in the olefin resin (a). Examples of the carboxyl group-containing radical-polymerizable monomer (b) include the monomers enumerated above as examples of that reactive to an epoxy group in the olefin resin (a). Of these radical-polymerizable monomers, those having an isocyanate group are most preferred.

In the case where the olefin resin (a) contains an isocyanate group, the functional group contained in the radical-polymerizable monomer (b) and reactive tb the isocyanate group may be hydroxyl group or carboxyl group. Examples of the radical-polymerizable monomer (b) containing a hydroxyl group and of that containing a carboxyl group are as enumerated above. Of these radical-polymerizable monomers, those having a hydroxyl group are most preferred.

In conducting the reaction of an olefin resin (a) with a radical-polymerizable monomer (b), the preferred amounts of these reactants used are such that the amount of the functional group in the radical-polymerizable monomer (b) is from 0.1 to 10 equivalents to the functional group in the olefin resin (a). If the radical-polymerizable monomer amount is less than 0.1 equivalent in terms of functional group amount, the copolymerization of the resulting radical-polymerizable olefin resin (I) and a monomer (c) copolymerizable therewith disadvantageously yields a reaction product in which the content of homopolymer of the monomer (c) is too high. On the other hand, if the amount thereof is larger than 10 equivalents, gelation tends more to occur.

The reaction temperature is generally from 20° to 150° C., preferably from 50° to 120° C. In order to accelerate the reaction, a catalyst may be used. Exemplary catalysts in the case of an esterification reaction include acids or basic compounds such as sulfuric acid, p-toluenesulfonic acid, zinc chloride, pyridine, triethylamine, dimethylbenzylamine, and the like. Exemplary catalysts in the case of a urethane-forming reaction include dibutyl tin dilaurate and the like. It is preferable that for the purpose of preventing a radical-polymerizable monomer (b) from polymerizing to yield its homopolymer, the reaction be conducted in an oxygen or air atmosphere and a polymerization inhibitor, such as hydroquinone, hydroquinone monomethyl ether, phenothiazine, or the like, be added to the reaction system in a proper amount. The reaction is preferably performed in a suitable organic solvent such as, for example, toluene, xylene, methyl ethyl ketone, methyl isobutyl ketone, butyl acetate, Cellosolve acetate, or the like.

The monomer (c) to be copolymerized with the above-described radical-polymerizable olefin resin (I) to produce the resin composition of the present invention is a monomer containing an alkyl (meth)acrylate and/or a fluorine-containing unsaturated monomer as essential ingredients.

Examples of the alkyl (meth)acrylate as an essential ingredient include methyl (meth)acrylate, ethyl (meth)acrylate, butyl (meth)acrylate, 2-ethylhexyl (meth)acrylate, and the like, with methyl acrylate and methyl methacrylate being most preferred. Examples of the fluorine-containing unsaturated monomer include fluoroalkyl (meth)acrylates such as trifluoroethyl (meth)acrylate, tetrafluoropropyl (meth)acrylate, hexafluorobutyl (meth)acrylate, octafluoropentyl (meth)acrylate, heptadecafluorononyl (meth)acrylate, and heptadecafluorodecyl (meth)acrylate; fluorine-containing olefins such as tetrafluoroethylene, trifluoroethylene, vinylidene fluoride, vinyl fluoride, monochlorotrifluoroethylene, 1-chloro-2,2-difluoroethylene, 1,1-dichloro-2,2-difluoroethylene, vinylidene chlorofluoride, hexafluoropropene, 3,3,3,2-tetrafluoropropene, trifluoromethylethylene, 2-fluoropropene, 2-chloro-1,1,3,3,3-pentafluoropropene, 1,1,2-trichloro-3-trifluoropropene, perfluoro-1-butene, perfluoro1-p perfluorobutylethylene, perfluoro-1-heptene, perfluoro-1-nonene, 8-H-perfluoro-1-octene, perfluorohexylethylene, perfluorooctylethylene, perfluorodecylethylene, and perfluorododecylethylene; and the like. Of these, fluoroalkyl (meth)acrylates are most preferred.

Other copolymerizable monomers, for example, include α, β-unsaturated carboxylic acids such as (meth)acrylic acid and monoalkyl esters of maleic acid; hydroxyalkyl (meth)acrylates such as 2-hydroxyethyl (meth)acrylate, 2-hydroxypropyl (meth)acrylate, and 2-hydroxybutyl (meth)acrylate; polymerizable monomers having an oxirane group such as glycidyl (meth)acrylate; unsaturated amides such as (meth)acrylamide; (meth)acrylonitrile; epoxy acrylates; (meth)acrylates of alkylene oxide adducts; (meth)acrylates of polyhydric alcohols, such as ethylene glycol di(meth)acrylate and propylene glycol (meth)acrylate; urethane-modified polyacrylates containing a (meth)acryloyl group in each molecule; vinyl acetate; vinyl chloride; vinyl ethers such as ethyl vinyl ether, butyl vinyl ether, and hexyl vinyl ether; vinyl group-containing aromatic compounds such as vinyltoluene, styrene, and α-methylstyrene; olefins such as ethylene, propylene, butene, and isoprene; and the like.

In the monomer (c), the content of the essential ingredient(s) should be 30% by weight or more, preferably 50% by weight or more, based on the total amount of all the monomer ingredients constituting the monomer (c). If the content thereof is less than 30% by weight, the resin composition to be produced shows insufficient adhesion to fluorine-contained resins.

The resin composition of the present invention can be obtained by copolymerizing the radical-polymerizable olefin resin (I) obtained as described above and the specific monomer (c) described above. The amount of the monomer (c) used in the copolymerization with the olefin resin (I) is preferably from 10 to 90% by weight based on the total amount of the olefin resin (a) in the radical-polymerizable olefin resin (I) and the monomer (c). If the monomer (c) amount is less than 10% by weight, the resulting resin composition shows insufficient adhesion to fluorine-contained resins. If the amount thereof exceeds 90% by weight, adhesion to various substrates becomes insufficient. The copolymerization reaction of ingredient (I) with ingredient (c) may be conducted with heating at 50 to 200° C. for 1 to 20 hours in an organic solvent, as reaction medium, such as toluene, xylene, methyl ethyl ketone, methyl isobutyl ketone, butyl acetate, Cellosolve acetate, ethanol, butanol, propanol, or the like, using a peroxide, such as benzoyl peroxide, di-t-butyl peroxide, cumene hydroperoxide, etc., an azobis-type compound such as azobisisobutyronitrile, or the like as a polymerization catalyst in an amount of from 0.1 to 10% by weight, preferably from 1 to 5% by weight, based on the amount of ingredient (c). It is preferable that in this copolymerization, the reaction medium be used in such an amount that the total amount of ingredients (I) and (c) present in the reaction system is from 5 to 50% by weight based on the total amount of the reaction mixture. It is also preferable to carry out the reaction in an atmosphere or stream of an inert gas such as nitrogen gas. For the purpose of reducing the amount of residual monomers, an azobis-type compound and a peroxide may be used in combination as a polymerization initiator.

The copolymer obtained by the copolymerization described above consists mainly of a backbone polymer which is the olefin resin (a) and graft segments which are polymers made up of units derived from the monomer (c) containing an alkyl (meth)acrylate and/or a fluorine-containing unsaturated monomer. The backbone polymer and the graft segments are bonded with each other through the medium of an organic bond containing a hetero-atom and formed by the reaction of the functional group of the olefin resin (a) with the functional group of the radical-polymerizable monomer (b) in which the functional group is reactive to the functional group of the olefin resin (a).

Besides the graft copolymer, the reaction product resulting from the copolymerization reaction of ingredients (I) and (c) also contains a small proportion of a chain polymer of the monomer (c). This reaction product, however, can be used as it is as a resin composition for use in a primer. If required and necessary, the reaction product may be used after the chain polymer is separated by extraction.

The thus-obtained resin composition containing a copolymer of olefin resin (I) and monomer (c) of this invention for primer use (ingredient (A)) is normally used after being dissolved in an organic solvent, ingredient (B), that dissolves the resin mixture.

Examples of ingredient (B), the organic solvent dissolving ingredient (A), include ketones such as acetone, methyl ethyl ketone, and methyl isobutyl ketone, ethers such as dioxane and tetrahydrofuran, esters such as ethyl acetate, butyl acetate, and Cellosolve acetate, aromatic hydrocarbons such as toluene, xylene, and chlorobenzene, TETRALIN (T.M.) is tetrahydronaphthalene, mineral spirits, and mixtures thereof. The used amount of ingredient (A) is generally from 0.5 to 50% by weight, preferably from 2 to 30% by weight, and that of the organic solvent, ingredient (B), is generally from 99.5 to 50% by weight, preferably from 98 to 70% by weight, based on the total amount of ingredients (A) and (B).

The primer composition of the present invention may be prepared by isolating ingredient (A) from the reaction mixture and mixing it with ingredient (B). Normally, however, the solution resulting from the polymerization reaction for yielding ingredient (A) may be used as it is, as described hereinabove.

Additives such as anti-oxidants, light stabilizers, UV-absorbers, slipping agents, flame retardants, surface modifiers, viscosity modifiers, and suspension agents may be incorporated into the primer composition of this invention if required and necessary.

The primer composition of the present invention can be applied to substrates made of various polyolefin resins. Examples of the polyolefin resins include polyethylene, polypropylene, ethylene-propylene copolymers, ethylene-propylene-diene copolymers, styrene-butadiene copolymers and hydrogenation products thereof, polystyrene, and the like. The resin substrates are not particularly limited in shape, but it is preferable that the surfaces of the substrates have undergone such a treatment as corona discharge treatment, chromic acid treatment, flame treatment, or organic solvent treatment.

For applying the primer composition of this invention on a surface of a resin substrate, an ordinary coating technique may be used such as, for example, brushing, spray coating, dip coating, cast coating, or the like. The spread rate for the primer composition varies depending on the kind of the resin substrate to be coated, the proportion of each component in the primer composition, and other factors, but in general, the primer composition is applied at a dry thickness of from 1 to 100 μm. After coating, the primer composition applied may be dried at a temperature between room temperature and 150° C. to remove the organic solvent and other volatile components contained in the composition applied. Thereafter, a fluorine-contained resin coating may be formed thereon by extrusion lamination, co-extrusion lamination, fluidization dip coating, electrostatic coating, rotational molding, or the like.

The primer composition according to the present invention enhances the adhesion of fluorine-contained resins applied on surfaces of polyolefin resins and, hence, brings about a sufficient effect when used as a primer.

The present invention will be explained below with reference to the following examples, which should not be construed to be limiting the scope of the invention.

EXAMPLE 1

Poly(methyl methacrylate)-crafted hydrogenated styrene-butadiene-styrene block copolymer modified with maleic anhydride Into a glass flask equipped with a stirrer, reflux condenser, dropping funnel, and thermometer were introduced 100 g of a hydrogenated styrene-butadiene-styrene block copolymer (Kraton G-1652, manufactured by Shell Chemical Co.) and 1,000 g of xylene. The air inside the flask was replaced with nitrogen and the temperature was raised to 125° C. Thereto were then added dropwise over a period of 6 hours a solution prepared by dissolving 4.0 g of maleic anhydride and 0.6 g of dicumyl peroxide in 80 g of xylene. After completion of the reaction, the reaction system was cooled to around room temperature and acetone was then added thereto to reprecipitate the hydrogenated styrene-butadiene-styrene block copolymer modified with maleic anhydride. The precipitate was then filtered off and dried, thereby obtaining a modified resin (a) in a white powder form. This modified resin was analyzed by infrared spectroscopy and neutralization titration and, as a result, the maleic anhydride content was found to be 1.5% by weight. Subsequently, 20 g of the thus-obtained, maleic anhydride-modified hydrogenated styrene-butadiene-styrene block copolymer and 150 g of toluene were placed in a glass flask equipped with a stirrer, reflux condenser, dropping funnel, and thermometer, and the contents were heated to 70° C. in an air stream to dissolve the copolymer. Thereto was added a solution prepared by dissolving 0.36 g of 2-hydroxyethyl acrylate (b), 1 g of dimethylbenzylamine, and 0.06 g of hydroquinone monomethyl ether in 30 g of toluene. Reaction was then allowed to proceed at that temperature for 5 hours. The resulting reaction product (I) was analyzed by infrared spectroscopy and, as a result, it was found that 55% of the grafted maleic anhydride was in the form of half ester with 2-hydroxyethyl acrylate. Subsequently, the temperature of the reaction system was raised to 80° C. in a nitrogen stream, and a solution prepared by dissolving 20 g of methyl methacrylate (c) and 0.2 g of azobisisobutyronitrile in 80 g of toluene was added thereto dropwise over a period of 4 hours. Thereafter, 0.2 g of azobisisobutyronitrile was further added to the reaction mixture and reaction was conducted for 6 hours, and then 0.2 g of azobisisobutyronitrile was added again and reaction was conducted for another 5 hours. Thus, a primer composition having an ingredient (A) concentration of 13.3% by weight was obtained.

A polypropylene resin substrate (FY 6C, manufactured by Mitsubishi Petrochemical Co., Ltd., Japan) having dimensions of 3 mm by 70 mm by 150 mm was degreased with 1,1,1-trichloroethane solution. On the degreased surface, the above-obtained primer composition was coated with a bar coater and dried in an oven drier set at 80° C for 2 minutes to obtain a primer-coated substrate containing a coating having a dry thickness of 5 μm. Subsequently, a top coat layer (film thickness, 20 μm) was formed from a poly(vinylidene fluoride) resin on the primer-coated substrate surface by a heat lamination method (150° C., 20 kg/cm$^2$).

The adhesion of the coating was evaluated by a cross-cut tape test in which the coating layer of the above-obtained laminate was crosshatched at a depth reaching the substrate to make 100 1-mm squares and a cellophane tape was used to examine the adhesion of the crosshatched portion of the coating. As a result, 84 squares remained unpeeled.

EXAMPLES 2 TO 9 AND COMPARATIVE EXAMPLES 1 AND 2

Primer compositions were obtained in the same manner as in Example 1 except that 20 g each of the monomers shown in Table 1 were used as ingredient (c) in place of methyl methacrylate used in Example 1.

Using the thus-obtained primer compositions, an adhesion test was conducted in the same manner as in Example 1. The results obtained are shown in Table 1.

Criteria for Evaluation

TABLE 1

| | Ingredient (c) | (wt %) | Evaluation |
|---|---|---|---|
| Example 2 | Methyl methacrylate | (90) | ⊚ |
| | Heptadecafluorononyl methacrylate | (10) | |
| Example 3 | Methyl methacrylate | (90) | ○ |
| | Trifluoroethyl methacrylate | (10) | |
| Example 4 | Methyl methacrylate | (50) | ⊚ |
| | Heptadecafluorononyl methacrylate | (50) | |
| Example 5 | Methyl methacrylate | (50) | ○ |
| | Trifluoroethyl methacrylate | (50) | |
| Example 6 | Heptadecafluorononyl methacrylate | (100) | ○ |
| Example 7 | Trifluoroethyl methacrylate | (100) | ○ |
| Example 8 | Methyl methacrylate | (90) | ⊚ |
| | Hydroxyethyl acrylate | (10) | |
| Example 9 | Methyl methacrylate | (70) | ○ |
| | Hydroxyethyl methacrylate | (30) | |
| Comparative Example 1 | Hydroxyethyl acrylate | (100) | X |
| Comparative Example 2 | Hydroxyethyl methacrylate | (100) | X |

Residual squares
100-80 ... ⊚
79-50 ... ○
49-0 ... X

EXAMPLES 10 TO 13

Primer compositions were obtained in the same manner as in Example 1 except that the amount of methyl methacrylate (abbreviated as MMA) used in the primer composition preparation was changed as shown in Table 2.

Using the thus-obtained primer compositions, an adhesion test was conducted in the same manner as in Example 1. The results obtained are shown in Table 2.

TABLE 2

| | MMA amount (g) | MMA content in ingredient (A) (wt %) | Ingredient (A) concentration in the primer (wt %) | Evaluation |
|---|---|---|---|---|
| Example 10 | 2.2 | 10 | 7.9 | ○ |
| Example 11 | 8.6 | 30 | 9.9 | ⊚ |
| Example 12 | 46.7 | 70 | 20.4 | ⊚ |
| Example 13 | 180 | 90 | 43.5 | ○ |

EXAMPLES 14 TO 22 AND COMPARATIVE EXAMPLES 3 AND 4

Poly(methyl methacrylate)-grafted chlorinated polypropylene modified with maleic anhydride Into a glass flask equipped with a stirrer, reflux condenser, dropping funnel, and thermometer were introduced 20 g of a chlorinated, maleic anhydride-modified polypropylene (a) (Superchlon 822, manufactured by Sanyo-Kokusaku Pulp Co., Ltd., Japan) and 150 g of xylene. In an air stream, the contents in the flask were heated to 70° C. to dissolve the polymer. Thereto was added a solution prepared by mixing 0.59 g of 2-hydroxyethyl acrylate (b), 1 g of dimethylbenzylamine, 0.06 of hydroquinone monomethyl ether, and 30 g of xylene. Reaction was then allowed to proceed at that temperature for 5 hours. Subsequently, using 20 g each of the monomers (c) shown in Table 3, graft reaction was conducted in the same manner as in Example 1, thereby obtaining reaction products having an ingredient (A) concentration of 13.3% by weight.

Using the thus-obtained reaction products as primer compositions, an adhesion test was conducted in the same manner as in Example 1. The results obtained are shown in Table 3.

TABLE 3

| | Ingredient (c) | (wt %) | Evaluation |
|---|---|---|---|
| Example 14 | Methyl methacrylate | (100) | ⊚ |
| Example 15 | Methyl methacrylate | (90) | ⊚ |
| | Heptadecafluorononyl methacrylate | (10) | |
| Example 16 | Methyl methacrylate | (90) | ○ |
| | Trifluoroethyl methacrylate | (10) | |
| Example 17 | Methyl methacrylate | (50) | ⊚ |
| | Heptadecafluorononyl methacrylate | (50) | |
| Example 18 | Methyl methacrylate | (50) | ○ |
| | Trifluoroethyl methacrylate | (50) | |
| Example 19 | Heptadecafluorononyl methacrylate | (100) | ○ |
| Example 20 | Trifluoroethyl methacrylate | (100) | ○ |
| Example 21 | Methyl methacrylate | (90) | ⊚ |
| | Hydroxyethyl acrylate | (10) | |
| Example 22 | Methyl methacrylate | (70) | ○ |
| | Hydroxyethyl methacrylate | (30) | |
| Comparative Example 3 | Hydroxyethyl acrylate | (100) | X |
| Comparative Example 4 | Hydroxyethyl methacrylate | (100) | X |

While the invention has been described in detail and with reference to specific embodiments thereof, it will be apparent to one skilled in the art that various changes and modifications can be made therein without departing from the spirit and scope thereof.

What is claimed is:

1. A resin composition for primer use which contains a copolymer of (I) a radical-polymerizable olefin resin and (c) a monomer copolymerizable with said olefin resin (I) and containing an alkyl (meth)acrylate, a fluorine-containing unsaturated monomer or mixture thereof, said radical-polymerizable olefin resin (I) being a product of the reaction of (a) an olefin resin having at least one functional group per molecule with (b) a radical-polymerizable monomer having a functional group reactive to the functional group contained in said olefin resin (a).

2. A resin composition as claimed in claim 1, wherein said olefin resin (a) has a weight-average molecular weight of from 1,000 to 200,000.

3. A resin composition as claimed in claim 1, wherein the functional group contained in said olefin resin (a) is selected from the group consisting of a carboxylic acid group, a carboxylic acid anhydride group, epoxy group, hydroxyl group, and isocyanate group.

4. A resin composition as claimed in claim 1, wherein the functional group contained in said radical-polymerizable monomer (b) is selected from the group consisting of carboxylic acid group, carboxylic acid anhydride group, hydroxyl group, epoxy group, and isocyanate group.

5. A resin composition as claimed in claim 1, wherein said alkyl (meth)acrylate is selected from the group consisting of methyl acrylate and methyl methacrylate.

6. A primer composition comprising
   (A) a resin composition containing a copolymer of (I) a radical-polymerizable olefin resin and (c) a monomer copolymerizable with said olefin resin (I) and containing an alkyl (meth)acrylate, a fluorine-containing unsaturated monomer or mixture thereof, said radical-polymerizable olefin resin (I) being a product of the reaction of (a) an olefin resin having at least one functional group per molecule with (b) a radical-polymerizable monomer having a functional group reactive to the functional group contained in said olefin resin (a), and
   (B) an organic solvent,
   said ingredient (A) being dissolved in said ingredient (B).

7. A primer composition as claimed in claim 6, wherein the content of said ingredient (A) is from 0.5 to 50% by weight based on the total amount of said ingredients (A) and (B).

8. A primer composition as claimed in claim 6, wherein said organic solvent (B) is selected from the group consisting of ketones, ethers, esters, aromatic hydrocarbons, tetrahydronapthalene mineral spirits and mixtures thereof.

* * * * *